US009026044B2

United States Patent
Hsu et al.

(10) Patent No.: US 9,026,044 B2
(45) Date of Patent: May 5, 2015

(54) METHOD AND SYSTEM FOR RESPONDER-AWARE RELAY STATION SELECTION IN WIRELESS COMMUNICATION NETWORKS

(75) Inventors: Ju-Lan Hsu, San Jose, CA (US); Huai-Rong Shao, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 13/077,848

(22) Filed: Mar. 31, 2011

(65) Prior Publication Data

US 2011/0256828 A1  Oct. 20, 2011

Related U.S. Application Data

(60) Provisional application No. 61/324,825, filed on Apr. 16, 2010.

(51) Int. Cl.
*H04B 7/185* (2006.01)
*H04W 76/02* (2009.01)
*H04B 7/26* (2006.01)
*H04W 84/04* (2009.01)

(52) U.S. Cl.
CPC ............ *H04W 76/02* (2013.01); *H04B 7/2606* (2013.01); *H04W 84/047* (2013.01)

(58) Field of Classification Search
USPC ....................................... 455/7–25
See application file for complete search history.

(56) References Cited

U.S. PATENT DOCUMENTS

| 5,890,055 | A | 3/1999 | Chu et al. |
| 6,188,873 | B1 | 2/2001 | Wickman et al. |
| 6,301,514 | B1 | 10/2001 | Canada et al. |
| 7,042,352 | B2 | 5/2006 | Kates |
| 7,742,739 | B2 | 6/2010 | Cervera et al. |
| 7,853,204 | B2 * | 12/2010 | Tan et al. ............... 455/13.1 |
| 8,094,577 | B2 | 1/2012 | Kwon et al. |
| 8,145,125 | B2 | 3/2012 | Masoian et al. |
| 8,175,064 | B2 * | 5/2012 | Tan et al. ............... 370/335 |
| 8,385,324 | B2 | 2/2013 | Achir et al. |

(Continued)

FOREIGN PATENT DOCUMENTS

| JP | 2007074304 A | 3/2007 |
| JP | 2010081282 A | 4/2010 |

(Continued)

OTHER PUBLICATIONS

Russian Office Action dated Nov. 12, 2013 for Russian Patent Application No. 201214402407 from Federal Service for Intellectual Property (Rospatent), pp. 1-12, Moscow, Russian (Machine-generated English-language translation, pp. 1-8).

(Continued)

*Primary Examiner* — Fayyaz Alam
(74) *Attorney, Agent, or Firm* — Sherman IP LLP; Kenneth L. Sherman; Steven Laut (57) ABSTRACT

Responder-aware relay station selection in a wireless communication network is provided. One implementation includes evaluating operational parameters of multiple candidate wireless relay stations, and selecting a wireless relay station among the multiple candidate wireless relay stations based on the evaluation. A wireless communication is transmitted to the selected wireless relay station over a wireless communication medium.

34 Claims, 6 Drawing Sheets

(56) References Cited

U.S. PATENT DOCUMENTS

| | | | |
|---|---|---|---|
| 2008/0188177 A1* | 8/2008 | Tan et al. | 455/11.1 |
| 2009/0237317 A1 | 9/2009 | Rofougaran et al. | |
| 2010/0081430 A1 | 4/2010 | Rofougaran et al. | |
| 2010/0202322 A1* | 8/2010 | Cai et al. | 370/254 |
| 2010/0322193 A1 | 12/2010 | Hu et al. | |
| 2012/0202416 A1* | 8/2012 | Naden et al. | 455/7 |

FOREIGN PATENT DOCUMENTS

| | | |
|---|---|---|
| RU | 2341904 C2 | 12/2008 |
| WO | 2004091155 A1 | 10/2004 |

OTHER PUBLICATIONS

ECMA International, "Standard ECMA-387: High Rate 60 GHz PHY, MAC and PALs", 2nd Edition, ECMA International, Dec. 2010, pp. i-288, Geneva, Switzerland, http://www.ecma-international.org/publications/files/ECMA-ST/ECMA-387.pdf.

Chang, K. et al., "Service Coverage Extension in IEEE 802.11TGad (IEEE 802.11-09/0769r0)", IEEE, Jul. 11, 2009, pp. 1-15, United States.

Kwon, H. et al., "Anti-blocking Mechanism by Relay (IEEE 802.15/08/0522-00-003c)", IEEE, Jul. 15, 2008, pp. 1-31, United States.

IEEE Computer Society, "IEEE Std 802.11™-2007 (Revision of IEEE Std 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

U.S. Non-Final Office Action for U.S. Appl. No. 13/245,753 mailed Sep. 23, 2013.

ETSI, Digital Enhanced Cordless Telecommunications (DECT); Wireless Relay Station (WRS), European Telecommunication Standard, Mar. 1997, pp. 12-62, ETS 300 700, France.

Iwamura, M. et al., "Relay Technology in LTE-Advanced", Technology Reports, Sep. 2010, pp. 29-36, vol. 12, No. 2, NTT DOCOMO Technical Journal, Japan.

International Search Report and Written Opinion dated Feb. 28, 2013 for International Application No. PCT/KR2012/007692 from Korean Intellectual Property Office, pp. 1-8, Seo-gu, Daejeon, Republic of Korea.

U.S. Final Office Action for U.S. Appl. No. 13/245,753 mailed Feb. 25, 2014.

U.S. Advisory Action for U.S. Appl. No. 13/245,753 mailed May 15, 2014.

Russian Notice of Allowance dated May 19, 2014 for Russian Patent Application No. 2012144024 from Federal Service for Intellectual Property (Rospatent), pp. 1-21, Moscow, Russian (English-language translation, pp. 14-21).

U.S. Non-Final Action for U.S. Appl. No. 13/245,753 mailed Jun. 25, 2014.

U.S. Final Action for U.S. Appl. No. 13/245,753 mailed Dec. 1, 2014.

Canadian Office Action dated Nov. 13, 2014 for Canadian Application No. 2796652 from Canadian Intellectual Property Office, pp. 1-4, Ontario, Canada.

Japanese Office Action dated Jan. 6, 2015 for Japanese Application No. 2013-504836 from Japan Patent Office, pp. 1-7, Tokyo, Japan (Machine generated English-language translation attached, pp. 3-7).

U.S. Advisory Action for U.S. Appl. No. 13/245,753 mailed Jan. 30, 2015.

* cited by examiner

FIG. 1

| Order | Information |
|---|---|
| 1 | Category |
| 2 | Action |
| 3 | Dialog Token |
| 4 | Status Code |
| 5 | Relay STA capabilities Info |
| 6 | STA1 Wakeup Schedule IE (optional) |
| 7 | STA1 Awake Window IE (optional) |
| 8 | STA1 Multi-band IE (optional) |
| ... | ... |
| K | Relay STA capabilities Info |
| K+1 | STAn Wakeup Schedule IE (optional) |
| K+2 | STAn Awake Window IE (optional) |
| K+3 | STAn Multi-band IE (optional) |
| ... | ... |

| | AID | Relay STA Capabilities Info | Wakeup Schedule IE (optional) | Awake Window IE (optional) | Multi-band IE (optional) | |
|---|---|---|---|---|---|---|
| Bits: | B0-B7 | B8-B15 | | | | ... |

METHOD AND SYSTEM FOR RESPONDER-AWARE RELAY STATION SELECTION IN WIRELESS COMMUNICATION NETWORKS

RELATED APPLICATION

This application claims priority from U.S. Provisional Patent Application Ser. No. 61/324,825, filed on Apr. 16, 2010, incorporated herein by reference.

FIELD OF THE INVENTION

The present invention relates to wireless networks, and in particular, to relay station selection in wireless networks.

BACKGROUND OF THE INVENTION

In wireless networks comprising wireless stations, the 60 GHz radio frequency band can provide approximately ten times the data communication rate between the wireless stations in comparison to data rates according to IEEE 802.11n standard. The increased data rate of the 60 GHz band is at the cost of reduced communication range and increased system complexities. Further, the 60 GHz band involves highly directional line-of-sight (LOS) transmission characteristics between wireless stations.

BRIEF SUMMARY OF THE INVENTION

Embodiments of the present invention provide a method and system for selecting a relay wireless station for communication between wireless stations. One embodiment comprises evaluating relaying operational parameters of multiple candidate wireless relay stations, and selecting a wireless relay station among the multiple candidate wireless relay stations based on the evaluation. A wireless communication comprises a transmission to the selected wireless relay station over a wireless communication medium.

These and other features, aspects and advantages of the present invention will become understood with reference to the following description, appended claims and accompanying figures.

DESCRIPTION OF THE INVENTION

In one embodiment, the present invention provides a method and system for responder-aware relay station selection in a wireless communication network. Embodiments of the present invention provide a process for discovery and selection of a wireless relay station among multiple candidate wireless relay stations for setting up relay operations in a wireless network. One embodiment comprises evaluating relaying operational parameters of multiple candidate wireless relay stations, selecting a wireless relay station among the multiple candidate wireless relay stations based on the evaluation, and initiating the transmission of a wireless communication to the selected wireless relay station over a wireless communication medium.

One embodiment of the invention provides the ability to communicate via a wireless relay station to increase the robustness and usability of 60 GHz band wireless networks. In one implementation, the present invention provides a method and system for discovery and selection of a candidate wireless relay station (i.e., relay STA) for efficient relay functionality in a wireless network such as wireless local area network (WLAN) comprising plural wireless stations capable of communication over a wireless medium such as a 60 GHz radio frequency (RF) band.

Figure 1:
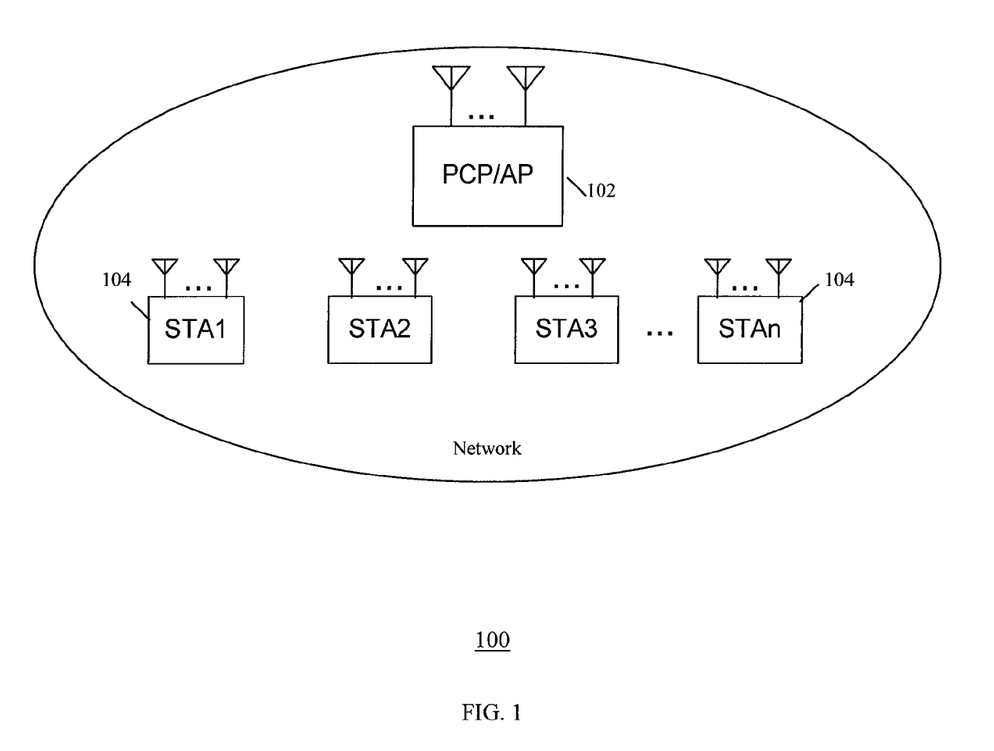
FIG. 1 shows a block diagram of a wireless communication system implementing relay discovery and selection, according to an embodiment of the present invention.

Example embodiments of the invention are described herein in relation to the IEEE 802.11 wireless communication protocol. FIG. 1 shows a block diagram of an example communication system 100 comprising a WLAN including multiple wireless stations such as a wireless personal basic service set (PBSS) control point (i.e., PCP) or access point (i.e., AP) station 102, and plural wireless stations 104 (i.e., STA1, ..., STAn), according to an embodiment of the invention. The stations 102 and 104 comprise transceivers capable of transmitting and receiving information over wireless channels.

Relaying allows a source relay usable wireless station (RUS) to transmit information frames to a destination RUS with the assistance of another wireless station called a relay supportable wireless station (RSUS). Relaying by a RSUS (e.g., wireless relay station) can improve the reliability of wireless communication (such as in the mmWave band), in case a direct link between the source RUS (e.g., source wireless station) and the destination RUS (e.g., destination wireless station) is disrupted.

The wireless network 100 in FIG. 1 implements relay station discovery and selection operations, according to an embodiment of the invention. At least one wireless station in the wireless network 100 comprises a RSUS. Two or more wireless stations (e.g., a source wireless station and a destination wireless station) in the wireless network 100 comprise RUS.

After associating with a relay supporting wireless network, a RUS such as an initiator wireless station discovers and evaluates wireless relay communication links with one or more candidate wireless relay stations (i.e., one or more RSUS wireless stations). This allows access to the relaying capabilities of candidate wireless relay stations, and determining their relaying capabilities and operational parameters comprising their presence period and multi-band status. These parameters determine the limits of the physical/functional capability of each wireless relay station in relaying information traffic, and can thus be used to assist in wireless relay selection.

In the description herein, a responder refers to the responder of a relay selection process as requested by an initiator (e.g., source wireless station). The responders can be the candidate wireless relay stations or a destination wireless station. In one embodiment, the responder wireless stations are made aware of the relay selection process by signaling. As described in more detail further below, the relay selection process includes beamforming (BF) training and channel measurements for wireless communication links between wireless stations, wherein responders of the relay selection process collect relevant information and later feedback the results to the initiator of the relay selection process, at the end of the beamforming training and channel measurement stage.

In one implementation of the invention, an initiator such as source wireless station and/or the PCP/AP discover, measure and select a candidate wireless relay station in conjunction with a destination wireless station. The selected relay wireless station wirelessly relays communications from the source wireless station to a responder wireless station such as a destination wireless station. The selected relay wireless station wirelessly relays communications from the destination wireless station to the source wireless station. An implementation of a relay discovery and selection process according to an embodiment of the invention is described below.

Fast Discovery and Assessment of the Candidate Relay Links

According to an embodiment of the invention, the source wireless station transmits a request to the PCP/AP for a list of candidate wireless relay stations and their relay capabilities. In response, the PCP/AP transmits the list of candidate wireless relay stations and their relay capabilities to the source wireless station. Such information may be also provided to the destination wireless station.

Figure 2:
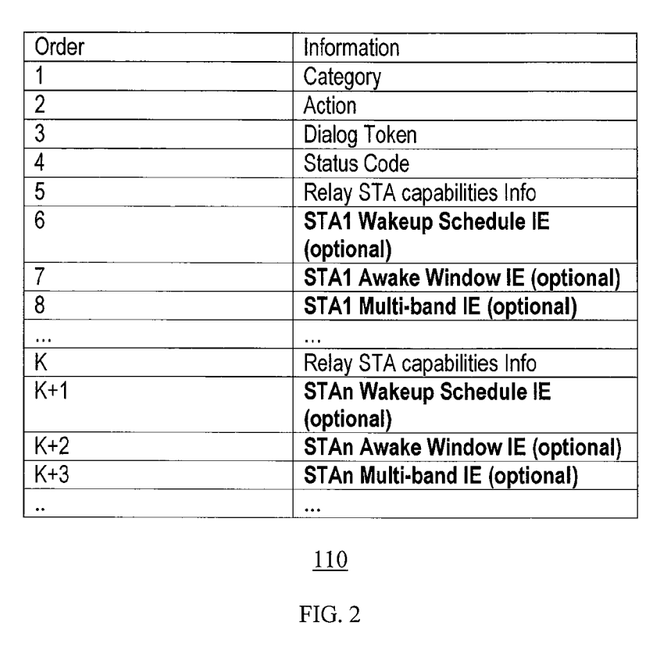
FIG. 2 shows a Relay Search Response frame including operational information for candidate wireless relay stations, according to embodiments of the invention.

As such, when a source wireless station desires to setup a relay communication link to a wireless relay station, the PCP/AP sends the source wireless station a list of candidate wireless relay stations with their relay capabilities, allowing the source wireless station to prescreen the candidate wireless relay stations. FIG. 2 shows a Relay Search Response frame 110 from the PCP/AP, according to embodiments of the invention. The operational information elements (IEs) or parameters may be included in a Relay Capability STA Info field 120, shown in FIG. 3, within the frame 110, for each candidate relay wireless station.

In one embodiment of the invention, the source and destination wireless stations perform directional transmission such as beamforming (BF) transmissions. If the source wireless stations or the destination wireless stations do not have an active communication link, or did not recently perform beamforming training with a candidate wireless relay station, then the source and/or destination wireless stations need to discover and beamform train with the candidate wireless relay station.

For efficient discovery and beamforming training with the candidate wireless relay stations, certain operating and status information of the candidate wireless relay station are beneficial to expediting the process.

Embodiments of the invention provide a process for communicating functional and operational parameters of each candidate wireless relay station, including wakeup schedule, awake window and multi-band information elements, to the source wireless station or the PCP/AP. Embodiments of the invention further provide signaling a relay selection process, and the wireless stations involved in the selection process, to the destination wireless station and the candidate wireless relay stations, by either a source directed or a PCP/AP directed relay selection process.

Figure 3:
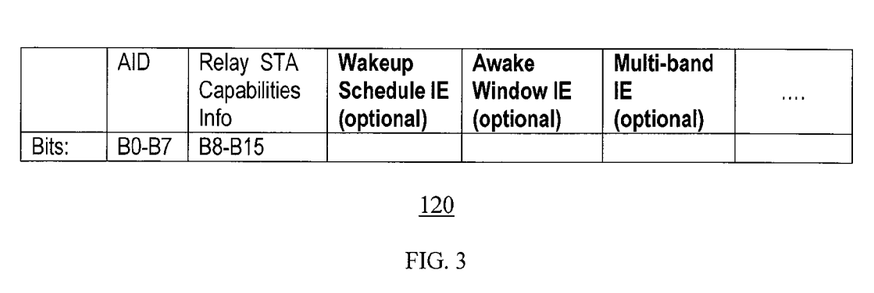
FIG. 3 shows a Relay Capability Station (STA) Info field including operational information for a candidate wireless relay station, according to embodiments of the invention.

In one embodiment, the relay discovery and selection process includes the PCP/AP sending relevant operating and status information in a Relay Capability STA Info field frame. In one example, such relevant operating and status information includes the Wakeup Schedule information elements (IEs), Awake Window IEs, Multi-band IE, etc., for candidate wireless relay stations to the source and destination wireless stations. FIG. 3 shows a frame format 120 for a Relay Capability STA Info field including Wakeup Schedule IE, Awake Window IE, Multi-band IE, according to an embodiment of the invention.

The source and destination wireless stations use such information to determine the presence period of a candidate wireless relay station and the operating band information during which the source and destination wireless station may attempt to obtain a Transmit Opportunity (TXOP) or Service Period (SP) for beamforming training and/or wireless channel measurement with the candidate wireless relay station.

Further, the operating and status information of each candidate wireless relay station may be used to determine the preference and suitability of a candidate wireless relay station serving as a relay, before and during the discovery/training process. The discovery of the candidate wireless relay stations need not be exhaustive based on the relay-capable list obtained from the PCP/AP.

Relay Selection Procedure

In one embodiment, the relay selection process begins with the source wireless station sending a relay search request frame to the PCP/AP and ends with the source wireless station selecting a relay wireless station upon collecting wireless channel measurement results across the candidate relay station directional wireless links (e.g., directional wireless links established by beamforming over wireless channels). Examples of such directional wireless links include a directional wireless link between a relay station and destination wireless station (relay-destination link) or directional wireless link between a relay station and a source wireless station (relay-source link).

Embodiments of the invention provide a responder-aware relay selection process to set up and proceed through the relay selection among a source wireless station, a destination wireless station, a relay wireless station and the PCP/AP. In one embodiment, the responders are specifically informed (e.g., via messages) of the relay selection process including beamforming training and relay link measurements for relay selection. As such, the responders of the relay selection process may collect relevant information for the relay selection process and feedback (report) the results to the source (initiator) at the end of the beamforming training and relay communication link measurement stage. In one embodiment, a relay communication link refers to a wireless channel for directional communication (e.g., via beamforming) between a relay station and a source wireless station, or between a relay station and a destination wireless station.

Source Directed Relay Selection Procedure

Figure 4:
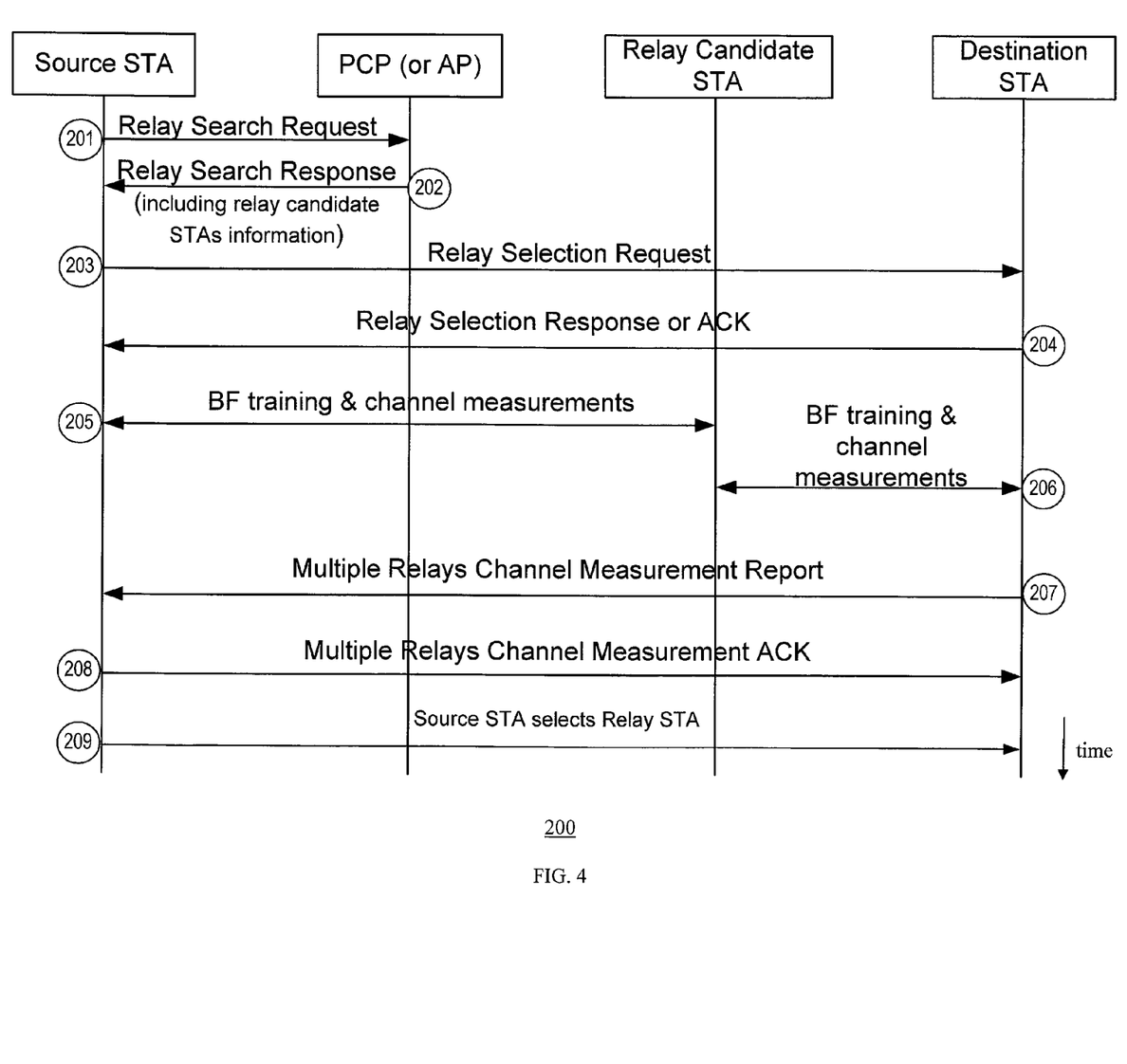
FIG. 4 shows a source wireless station directed process for relay discovery and selection, according to an embodiment of the invention.

According to an embodiment of the invention, the decision maker and the central hub of the relay selection process is the source wireless station. An illustrative source directed relay selection process 200 is depicted in FIG. 4, according to an embodiment of the invention. The relay selection process is not limited to that depicted in FIG. 4 and different variations may be deduced. For example, a corresponding PCP/AP directed relay selection process may also be deduced, according to embodiment of the invention, as will be recognized by those skilled in the art.

Referring to FIG. 4, if a source wireless station (i.e., Source STA) does not know or is not aware of one or more candidate wireless relay stations (i.e., Relay Candidate STAs) in a Basic Service Set (BSS) for the network, the source wireless station initiates the relay selection procedure by sending a relay search request to the PCP/AP (i.e., PCP or AP), in a process block 201. In process block 202 the PCP/AP responds with a Relay Search Response frame including a list of candidate wireless relay stations along with their corresponding relay capabilities and operating status information, as described above in relation to FIGS. 2-3. If the source wireless station has sufficient knowledge about available candidate wireless relay stations in the BSS, the source wireless station may skip relay search request process blocks 201 and 202.

Given the status and capability information available at the source wireless station, the source wireless station may screen and select a preferable subset of the candidate wireless relay stations. Said status and capability information may comprise information received from the PCP/AP in process block 202, or local information such as for existing relay communication link maintained between a candidate wireless relay station and the source wireless station.

In process block 203, the source wireless station initiates a relay selection request by sending a relay selection request frame to the destination wireless station (i.e., Destination STA) including a list of said preferable candidate wireless relay stations for the destination wireless station to consider. The relay selection request frame may include a subset of the status and capability information available to the source wireless station (such as a subset of the information provided to the source wireless station in said Relay Search Response frame from the PCP/AP).

If the source and destination wireless stations have already performed beamforming training with each other for directional communication therebetween, the source wireless station may send the relay selection request frame directly to the destination wireless station and receive a response therefrom. Otherwise, the source wireless station may send the relay selection request frame to the destination wireless station via the PCP/AP, and the destination wireless station can send a response back to the source wireless station via the PCP/AP.

In one embodiment of the invention, in process block 204 the destination wireless station may either acknowledge (ACK) the relay selection request frame or send a response frame rejecting a subset or all of the preferable candidate wireless relay stations with certain status code or reason code enclosed. As such the source and destination wireless station collaborate in selecting a relay wireless station suitable for both the source and destination wireless stations. The relay selection request frame and response exchange may be performed directly between the source and destination wireless station, or via the PCP/AP.

In process block 204, if the destination STA accepts one or more preferable candidate wireless relay station, in process block 205 the source wireless station performs necessary beamforming training and/or channel measurement process with each accepted wireless relay station. Similarly, in process block 206 the destination wireless station proceeds to perform necessary beamforming training and/or channel measurement process with each accepted wireless relay station. Such beamforming training follows known beamforming protocols and can be performed during a contention-based period (CBP) or by requesting a SP from the PCP/AP. A SP is a channel time block obtained using known channel time reservation mechanisms.

In one embodiment of the invention, before the beamforming training with each accepted wireless relay station, the source wireless station or the PCP/AP informs each wireless relay station about the relay selection process by sending an unsolicited relay search response and/or beamforming training scheduling information in an Extended Schedule element to the wireless relay station. Because the wireless relay stations are aware of the relay selection process, each such wireless relay station may feedback to the source wireless station any existing beamforming training and/or channel measurement results between that relay station and the source wireless station, as well as existing beamforming training and/or channel measurement results between that relay station and the destination wireless station.

In another embodiment, the source wireless station need not prescreen the candidate wireless relay stations for preferable relay stations. In that case, the relay selection request and response between the source wireless station and the destination wireless station can be replaced by a similar procedure but between the PCP/AP and the destination wireless station. Specifically, the PCP/AP forwards the relay search request and the relay selection request along with the list of candidate wireless relay stations to the destination wireless station, wherein the destination wireless station sends a response or ACK back to the PCP/AP with accepted relay stations, to provide to the source wireless station.

In another embodiment, the PCP/AP forwards or sends an unsolicited relay selection response with the list of candidate wireless relay stations to the destination wireless station (after the PCP/AP sends it to the source wireless station), thus eliminating the need for the destination wireless station to send a relay selection response or ACK back to the PCP/AP.

Referring back to FIG. 4, in process block 205, the source wireless station performs necessary beamforming training and channel measurements on the wireless communication link between each accepted relay station and the source wireless station (i.e., relay-source link or relay-initiator link), and collects information about the results of the beamforming training and channel measurements on each relay-source link.

In process block 206 the destination wireless station performs necessary beamforming training and channel measurements on the wireless communication link between necessary beamforming training and channel measurements on the wireless communication link between each accepted relay station and the destination wireless station (i.e., relay-destination link or relay-responder link), and collects information about the results of the beamforming training and channel measurements on each relay-designation link.

When the destination wireless station completes necessary beamforming training and channel measurements on each relay-destination link, in process block 207 the destination wireless station sends a multiple relays channel measurement report to the source wireless station, followed by an ACK frame sent by the source wireless station to the destination wireless station in process block 208. The multiple relays channel measurement report includes results of beamforming training and channel measurements on each relay-destination link.

In another embodiment, the source wireless station sends a multiple relays channel measurement request to the destination wireless station, and the destination wireless station sends a multiple relays channel measurement report back to the source wireless station.

In process block 209, the source wireless station uses the information in the multiple relays channel measurement report for each relay-destination link from the destination wireless station, along with its own information on each relay-source link, to select a proper relay wireless station among those accepted by the destination wireless station. The source wireless station then sends to the destination wireless station information about the selected wireless relay station for setting up relay links with the selected wireless relay station.

In another embodiment, the present invention provides a destination wireless station directed relay selection process, equivalent to that described above for a source wireless station directed relay selection process.

After a relay station is selected, the source and destination wireless stations set up relay procedures with the selected relay station and communicate data (e.g., audio/video data) via the selected relay station via directional wireless links.

PCP/AP Directed Relay Selection Procedure

Figure 5:
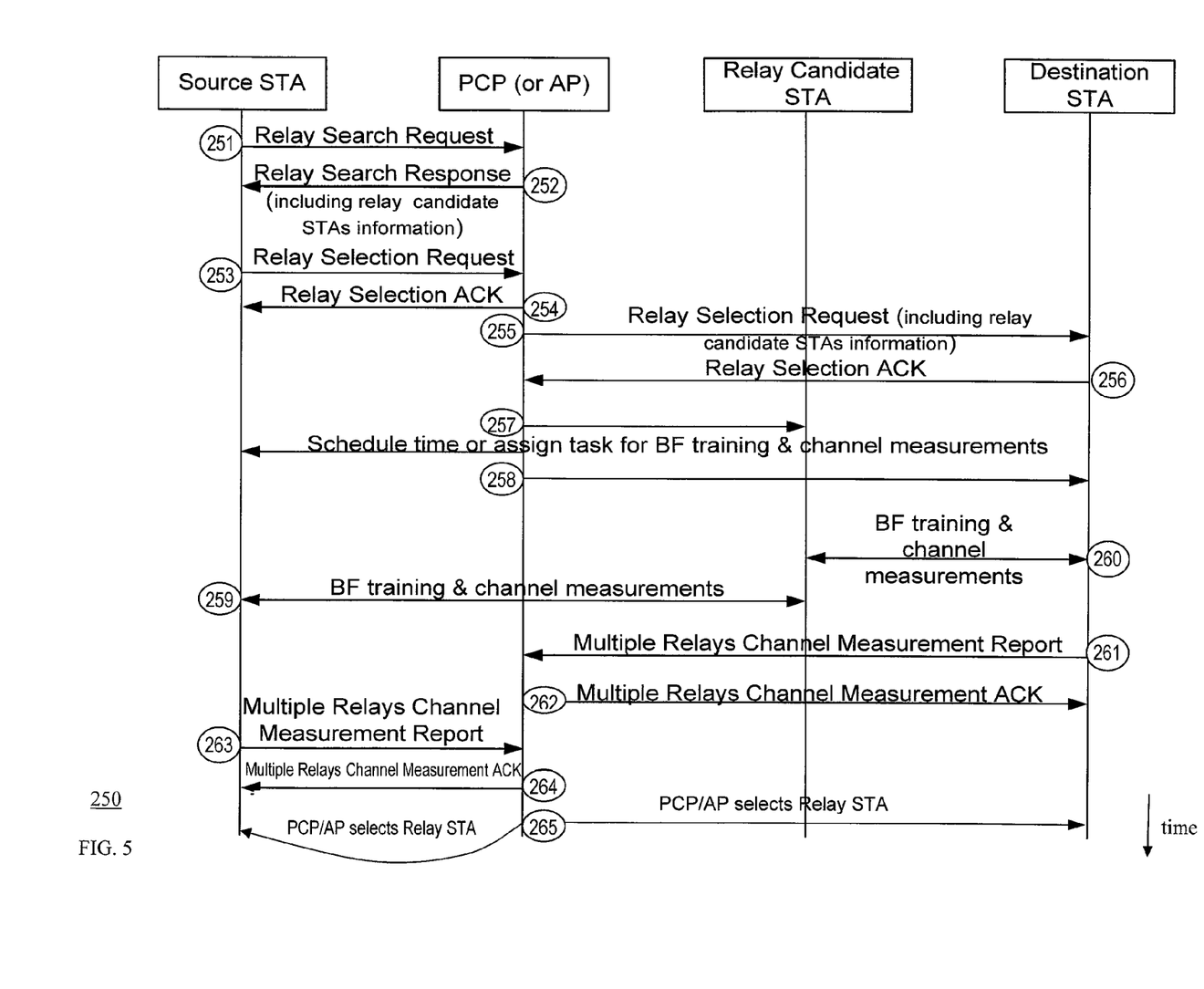
FIG. 5 shows a coordinator wireless station directed process for relay discovery and selection, according to an embodiment of the invention.

In another embodiment the present invention provides a PCP/AP (PCP or AP) directed relay discovery and selection process, wherein the decision maker and the central hub of the relay selection process is the PCP/AP. An illustrative PCP/AP directed relay selection process 250 is depicted in FIG. 5, according to an embodiment of the invention and described below.

If the source wireless station (Source STA) does not know or is not aware of one or more candidate wireless relay stations (Relay Candidate STAs), in process block 251 the source wireless station initiates a relay selection process by sending a relay search request frame to the PCP/AP. In process block 252, the PCP/AP responds with a list of candidate relay stations along with their corresponding relay capabilities and operating status information (described further above in relation to FIGS. 2-3). If the source wireless station has sufficient knowledge about available candidate relay stations in the BSS, the source wireless station may skip the relay search request process blocks 251, 252.

Given the information available at the source STA (received and/or local information such as for an existing link maintained between a candidate relay station and the source wireless station), the source wireless station may screen and select a subset of candidate relay stations and preferable relay stations.

In process block 253, the source wireless station sends a relay selection request frame to the PCP/AP to consider the list of preferable candidate relay stations. The relay selection request frame sent to the PCP/AP may include local information about relay links only available at the source wireless station. Upon receiving the relay selection request, in process block 254 the PCP/AP acknowledges the request, and then forwards the relay selection request along with the list of preferable candidate relay stations to the destination wireless station, in process block 255. The destination wireless station responds with a relay selection ACK frame, in process block 256. The PCP/AP proceeds to either process block 257 to allocate time for beamforming training and/or channel measurements among the source-relay and relay-destination wireless links, or to process block 257 to request that the source and destination stations perform beamforming training and/or channel measurements in a CBP, with the preferable candidate relay stations.

In another embodiment, the source wireless station does not prescreen the candidate relay stations, wherein the relay search request and the relay selection request can be combined such that the relay selection request and ACK between the source wireless station and the PCP/AP is eliminated.

Similar to process blocks 205 and 206 in FIG. 4, in process blocks 259 and 260 in FIG. 5 the source and destination wireless stations complete necessary beamforming training and measurements on the relay-source links and the relay-destination links for candidate relay stations accepted by the destination relay station in process block 256.

In process block 261, the destination wireless station sends a multiple relays channel measurement report to the PCP/AP, followed by an ACK frame sent by the PCP/AP to the destination wireless station in process block 262. Similarly in process block 263, the source wireless station sends a multiple relays channel measurement report to the PCP/AP, followed by an ACK frame sent by the PCP/AP to the source wireless station in process block 264.

In another embodiment, the PCP/AP schedules channel time for the source and destination stations to perform necessary training and measurements with accepted relay stations, and the PCP/AP requests for said multiple relays channel measurement reports from the source and destination wireless stations, wherein the source and destination wireless stations send back to the PCP/AP said multiple relays channel measurement reports containing said relay-source and relay-destination beamforming training and channel measurement results, respectively.

In another embodiment, the source wireless stations sends a multiple relays channel measurement request to the destination wireless stations, and then the destination wireless stations sends the multiple relays channel measurement reports back to the PCP/AP.

In process block 265 the PCP/AP then uses the received multiple relays channel measurement reports from the source and destination wireless stations to select a relay station among the accepted relay stations. The PCP/AP also sends to the source and destination wireless stations information about the selected relay station when setting up a relay link. In another embodiment, the PCP/AP may also be selected as the relay station based on the channel measurements results.

After a relay station is selected, the source and destination wireless stations set up relay procedures with the selected relay station and communicate data (e.g., audio/video data) via the selected relay station via directional wireless links.

Figure 6:
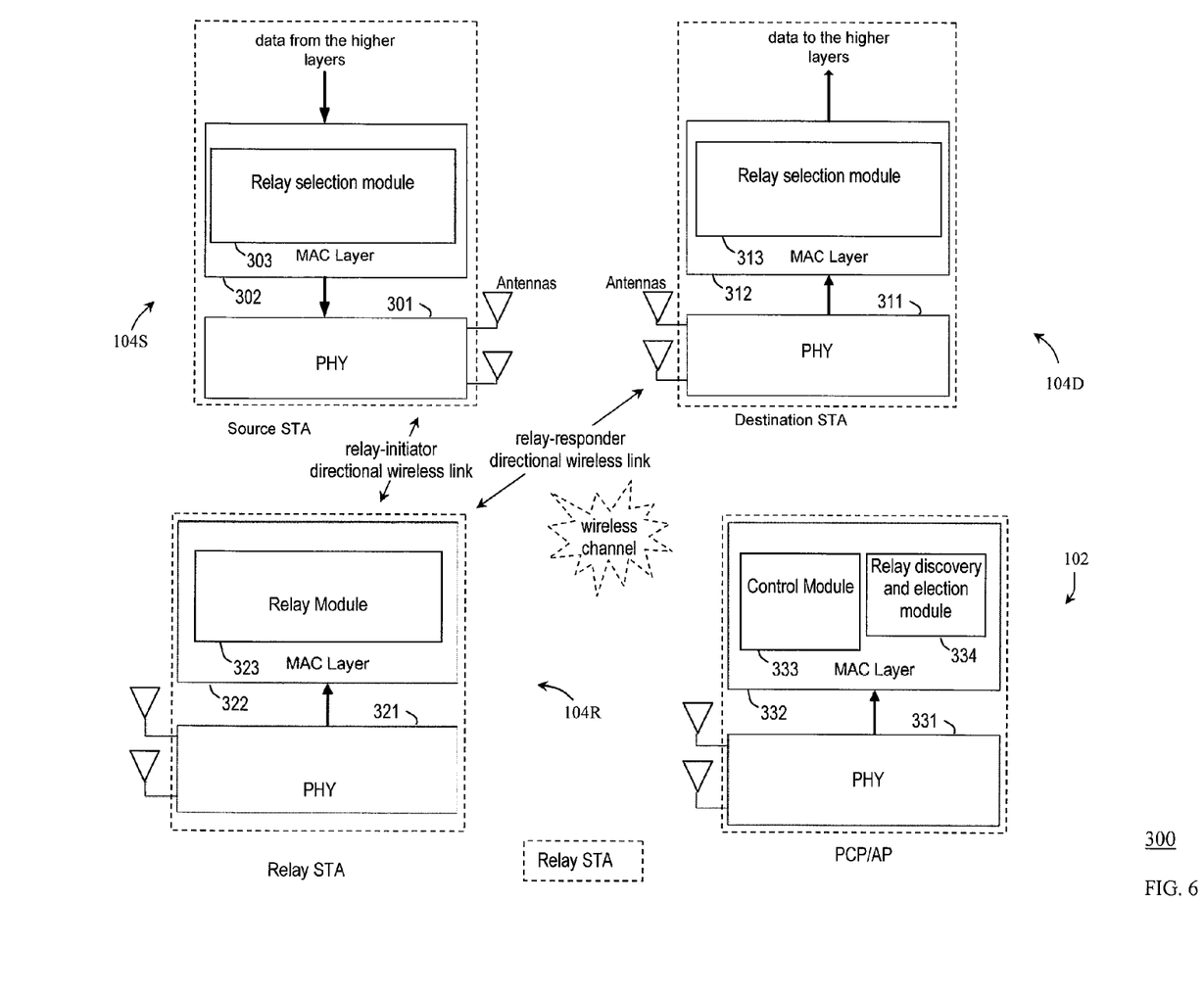
FIG. 6 shows a block diagram of a wireless local area network implementing relay discovery and selection, according to an embodiment of the present invention

FIG. 6 shows a block diagram of an example implementation of a wireless communication system 300 providing relay station discovery and selection, according to an embodiment of the invention. The system 300 comprises a wireless PCP/AP 102 and wireless stations 104 (e.g., STA1, . . . , STAn in FIG. 1) including a source wireless station (source STA) 104S, a destination wireless station (destination STA) 104D, at least one wireless relay STA 104R, in a wireless local area network.

In one embodiment, the network 300 implements a frame structure for wireless communication between the wireless devices/stations therein. The frame structure utilizes packet transmission in a Media Access Control (MAC) layer and a physical (PHY) layer. Each wireless station includes a MAC layer and a PHY layer. The MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the AP to attach a PHY header (i.e., a PHY preamble) thereto to construct a PHY Protocol Data Unit (PPDU). The PHY header includes parameters for determining a transmission scheme including a coding/modulation scheme.

Specifically, the source STA 104S comprises a PHY layer 301 and a MAC layer 302. The MAC layer 302 includes a relay selection module 303 which implements relay discovery and selection for the source STA 104S, according to embodiments of the invention as described herein.

The destination STA 104D comprises a PHY layer 311 and a MAC layer 312. The MAC layer 312 includes a relay selection module 313 which implements relay discovery and selection for the destination STA 104D, according to embodiments of the invention as described herein.

Each relay STA 104R includes a PHY layer 321 and a MAC layer 322. The MAC layer 322 includes a relay module 323 which implements relay operations, according to embodiments of the invention as described herein.

The PCP/AP 102 comprises a PHY layer 331 and a MAC layer 332. The MAC layer 332 includes a control module 333 which, among other operations, implements typical functions of a PCP/AP. The MAC layer 332 further includes a relay discovery and selection module 334 which implements relay discovery and selection for PCP/AP, according to embodiments of the invention as described herein According to embodiments of the invention, in network 300 relevant functional and operational information of each candidate relay station is distributed among the source, destination and the PCP/AP stations in early stages of the relay setup, thus avoiding inefficiency and overhead associated with a relay selection process. The relay candidate discovery and selection process may either be directed by the source STA 104S, destination STA 104D or the PCP/AP 102, with more flexibility to leverage existing local information. Embodiments of the invention are useful where source and the destination STAs 104S and 104D may (or may not) have a direct link beamforming-trained with the relay stations before the relay selection process. Embodiments of the invention are further useful where the source and the destination STAs 104S and 104D cannot communicate with each other directly.

The participation of a selected relay STA 104R in a relay operation between the source STA 104S and the destination STA 104D is non-binding, wherein the selected relay STA 104R may cease such relay function at its discretion. This provides relay stations higher flexibility and incentive to collaborate. In one embodiment, a backup relay wireless station is always maintained for a source wireless station and a destination wireless station in case of the departure of a current selected relay station.

In one embodiment, a source wireless station that wishes to select a relay wireless station for relay operations may utilize information (parameters) including the buffering capability of each candidate relay wireless station before proceeding to the setup process. Such parameters serve not only as a decision factor for the relay selection process but also as operating parameters to avoid faulty operations such as buffer overflow at the selected wireless relay station.

Example embodiments of the invention have been described herein in relation to IEEE 802.11 wireless communication protocol. Embodiments of the invention are useful with wireless networks such as WLANs, millimeter-wave (mmWave) wireless networks, IEEE 802.11ad wireless networks, Wireless Gigabit Alliance (WiGig) wireless networks, etc. In one example, the wireless stations in FIG. 6 (and FIG. 1), are capable of performing directional communication such as by antenna training and beamforming (e.g., in the 60 GHz RF band), according to embodiments of the invention.

Figure 7:
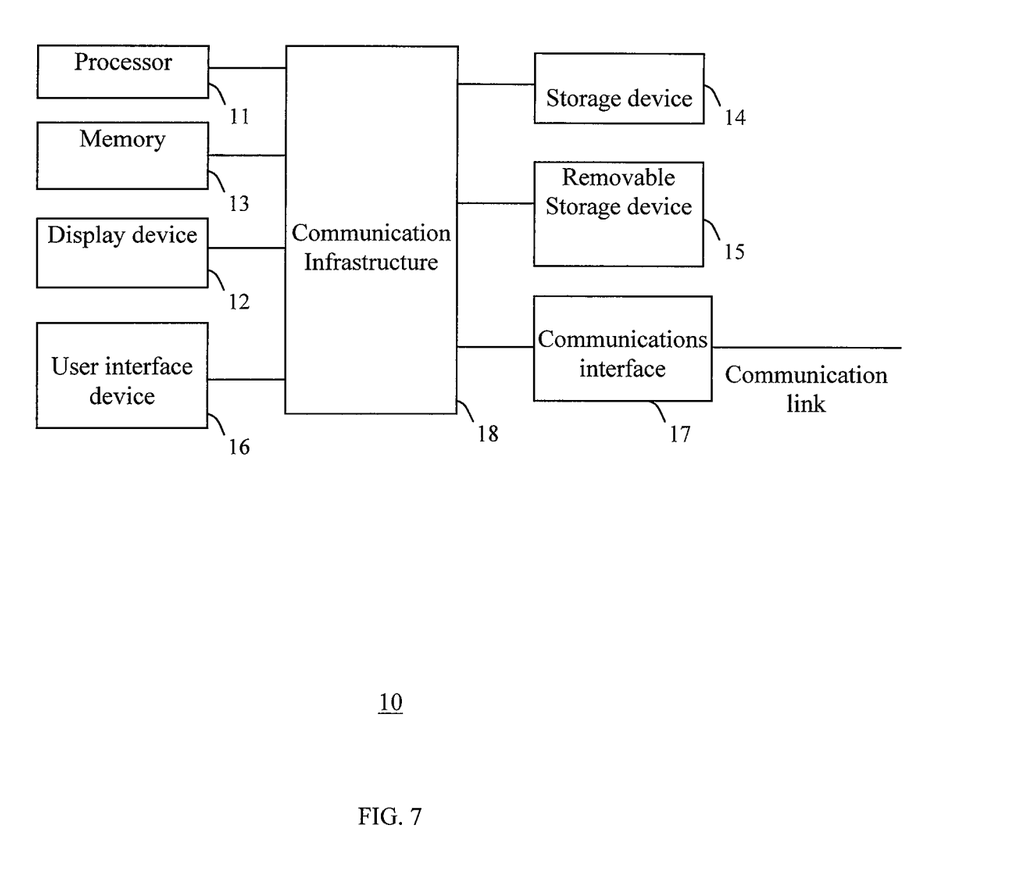
FIG. 7 is a high level block diagram showing an information processing system comprising a computer system useful for implementing an embodiment of the present invention.

FIG. 7 is a high level block diagram showing an information processing system comprising a computer system 10 useful for implementing an embodiment of the present invention. The computer system 10 includes one or more processors 11, and can further include an electronic display device 12 (for displaying graphics, text, and other data), a main memory 13 (e.g., random access memory (RAM)), storage device 14 (e.g., hard disk drive), removable storage device 15 (e.g., removable storage drive, removable memory module, a magnetic tape drive, optical disk drive, computer readable medium having stored therein computer software and/or data), user interface device 16 (e.g., keyboard, touch screen, keypad, pointing device), and a communication interface 17 (e.g., modem, a network interface (such as an Ethernet card), a communications port, or a PCMCIA slot and card). The communication interface 17 allows software and data to be transferred between the computer system and external devices. The system 10 further includes a communications infrastructure 18 (e.g., a communications bus, cross-over bar, or network) to which the aforementioned devices/modules 11 through 17 are connected.

Information transferred via communications interface 17 may be in the form of signals such as electronic, electromagnetic, optical, or other signals capable of being received by communications interface 17, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Such computer programs represent controllers of the computer system.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Though the present invention has been described with reference to certain versions thereof; however, other versions are possible. Therefore, the spirit and scope of the appended claims should not be limited to the description of the preferred versions contained herein.

What is claimed is:

1. A method of wireless communication, comprising:
signaling a relay selection process to one or more wireless stations to obtain relaying operational parameters comprising presence period and multi-band information of multiple candidate wireless relay stations;
evaluating relaying operational parameters of said multiple candidate wireless relay stations;
selecting a wireless relay station among the multiple candidate wireless relay stations based on the evaluation; and
initiating transmission of a wireless communication to the selected wireless relay station over a wireless communication medium.

2. The method of claim 1, further comprising:
setting up relay operations using the selected wireless relay station and performing wireless communication between wireless stations via the selected wireless relay station over the wireless communication medium.

3. The method of claim 1, wherein:
performing wireless communication using the selected wireless relay station comprises an initiator wireless station and a responder wireless station wirelessly communicating via the selected wireless relay station;
the selected wireless relay station wirelessly relays communications from the initiator wireless station to the responder wireless station; and
the selected wireless relay station wirelessly relays communications from the responder wireless station to the initiator wireless station.

4. The method of claim 3, wherein:
selecting a wireless relay station among the multiple candidate wireless relay stations further comprises the initiator wireless station selecting a wireless relay station among the multiple candidate wireless relay stations.

5. The method of claim 3, wherein:
selecting a wireless relay station among the multiple candidate wireless relay stations further comprises the responder wireless station selecting a wireless relay station among the multiple candidate wireless relay stations.

6. The method of claim 3, wherein:
selecting a wireless relay station among the multiple candidate wireless relay stations further comprises the initiator wireless station and the responder wireless station collaboratively selecting a wireless relay station among the multiple candidate wireless relay stations.

7. The method of claim 3, further comprising:
a coordinator wireless station providing a list of multiple candidate wireless relay stations; and
evaluating relaying operational parameters of said multiple candidate wireless relay stations for selecting a relay wireless station.

8. The method of claim 7, wherein:
selecting a wireless relay station among the multiple candidate wireless relay stations further comprises the initiator wireless station sending a relay search request frame to the coordinator wireless station, wherein the coordinator wireless station provides said list of multiple candidate wireless relay stations to the initiator and the responder wireless station.

9. The method of claim 8, further comprising:
the initiator wireless station selecting a wireless relay station among the multiple candidate wireless relay stations by obtaining and evaluating wireless communication link measurements for the multiple candidate wireless relay stations.

10. The method of claim 9, further comprising:
the coordinator wireless station collecting wireless communication link measurements for the multiple candidate wireless relay stations, and providing said measurements to the initiator wireless station.

11. The method of claim 7, wherein:
said relaying operational parameters further comprise wakeup schedule and awake window information for each candidate wireless relay station.

12. The method of claim 3, wherein:
the initiator wireless station comprises a source wireless station; and
the responder wireless station comprises a destination wireless station.

13. The method of claim 12, wherein the source wireless station and the destination wireless station operate in a millimeter-wave radio frequency band wireless network.

14. A wireless communication station, comprising:
a relay selection module that signals a relay selection process to one or more wireless stations to obtain relaying operational parameters comprising presence period and multi-band information of multiple candidate wireless relay stations, wherein the relay selection module evaluates relaying operational parameters of multiple candidate wireless relay stations, and selects a wireless relay station among the multiple candidate wireless relay stations based on the evaluation; and
a communication layer that initiates transmission of a wireless communication to the selected wireless relay station over a wireless communication medium.

15. The wireless communication station of claim 14, wherein:
the communication module sets up relay operations using the selected wireless relay station for communicating with another wireless station via the selected wireless relay station.

16. The wireless communication station of claim 14, wherein:
the relay selection module selects a wireless relay station among the multiple candidate wireless relay stations in collaboration with said another wireless station.

17. The wireless communication station of claim 14, wherein:
the relay selection module obtains a list of multiple candidate wireless relay stations from a coordinator wireless station and the relay selection module evaluates operational parameters of said multiple candidate wireless relay stations.

18. The wireless communication station of claim 17, wherein:

the relay selection module sends a relay search request frame to the coordinator wireless station, wherein the coordinator wireless station provides said list of multiple candidate wireless relay stations to the wireless communication station.

19. The wireless communication station of claim 18, wherein:
the relay selection module selects a wireless relay station among the multiple candidate wireless relay stations by obtaining and evaluating wireless communication link measurements for the multiple candidate wireless relay stations.

20. The wireless communication station of claim 18, wherein the wireless communication station comprises an initiator wireless station and said another wireless station comprises a responder wireless station.

21. The wireless communication station of claim 20, wherein:
the initiator wireless station obtains wireless communication link measurements for the multiple candidate wireless relay stations to generate relay-initiator communication link measurement results for each candidate wireless relay station; and
the responder wireless station obtains wireless communication link measurements for said multiple candidate wireless relay stations to generate relay-responder communication link measurement results for each candidate wireless relay station.

22. The wireless communication station of claim 21, wherein:
the relay selection module of the initiator wireless station evaluates operational parameters and said relay-responder and relay initiator communication link measurement results to select a wireless relay station suitable for communication between the initiator and responder wireless stations.

23. The wireless communication station of claim 22, wherein:
said operational parameters further comprise wakeup schedule and awake window information for each candidate wireless relay station.

24. A coordinator wireless communication station, comprising:
a relay selection module that selects a wireless relay station among multiple candidate wireless relay stations, for an initiator wireless station and a responder wireless station;
wherein the relay selection module signals a relay selection process to one or more wireless stations to obtain relaying operational parameters comprising presence period and multi-band information of multiple candidate wireless relay stations, such that the relay selection module evaluates operational parameters of said multiple candidate wireless relay stations and selects a wireless relay station based on the evaluation.

25. The coordinator wireless communication station of claim 24, wherein:
the relay selection module selects a wireless relay station among the multiple candidate wireless relay stations in collaboration with said initiator and responder wireless stations.

26. The coordinator wireless communication station of claim 24, wherein:
the relay selection module determines a list of multiple candidate wireless relay stations and evaluates operational parameters of said multiple candidate wireless relay stations for selecting a relay wireless station.

27. The coordinator wireless communication station of claim 26, wherein:
the relay selection module provides said list of multiple candidate wireless relay stations to the initiator and responder wireless stations; and
the relay selection module selects a wireless relay station among the multiple candidate wireless relay stations by obtaining and evaluating wireless communication link measurements for the multiple candidate wireless relay stations from the initiator and responder wireless stations.

28. The coordinator wireless communication station of claim 27, wherein:
the initiator wireless station determines wireless communication link measurements for the multiple candidate wireless relay stations to generate relay-initiator communication link measurement results for each candidate wireless relay station, and provides the measurement results to the coordinator station; and
the responder wireless station determines wireless communication link measurements for said multiple candidate wireless relay stations to generate relay-responder communication link measurement results for each candidate wireless relay station, and provides the measurement results to the coordinator station.

29. The coordinator wireless communication station of claim 28, wherein:
the relay selection module evaluates operational parameters and said relay-responder and relay initiator communication link measurement results to select a wireless relay station suitable for communication between the initiator and responder wireless stations.

30. The coordinator wireless communication station of claim 29, wherein:
said operational parameters further comprise wakeup schedule and awake window information for each candidate wireless relay station.

31. The coordinator wireless communication station of claim 30 wherein the coordinator wireless communication station, the initiator wireless station, the responder wireless station and the relay stations communicate information on the wireless communication medium in a wireless network.

32. The coordinator wireless communication station of claim 30, wherein the network comprises a millimeter-wave wireless network.

33. The method of claim 3, wherein said relaying operational parameters are used by the initiator wireless station and the responder wireless station for determining the presence period information of a candidate relay station.

34. The method of claim 3, wherein said relaying operational parameters are used by the initiator wireless station and the responder wireless station for determining operating band information during which the initiator wireless station and the responder wireless station attempt to obtain a Transmit Opportunity (TXOP) or Service Period (SP) for one or more of beamforming training and wireless channel measurement with the candidate wireless relay station.

* * * * *